United States Patent
Cai et al.

(10) Patent No.: US 11,545,833 B2
(45) Date of Patent: Jan. 3, 2023

(54) HIGH-VOLTAGE HIERARCHY HUNDRED-MEGAWATT LEVEL BATTERY ENERGY STORAGE SYSTEM

(71) Applicant: SHANGHAI JIAO TONG UNIVERSITY, Shanghai (CN)

(72) Inventors: Xu Cai, Shanghai (CN); Chang Liu, Shanghai (CN); Rui Li, Shanghai (CN); Yunfeng Cao, Shanghai (CN); Xiaolong Cai, Shanghai (CN); Tao Liu, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 17/280,053

(22) PCT Filed: Aug. 14, 2020

(86) PCT No.: PCT/CN2020/109169
§ 371 (c)(1),
(2) Date: Mar. 25, 2021

(87) PCT Pub. No.: WO2021/098298
PCT Pub. Date: May 27, 2021

(65) Prior Publication Data
US 2022/0045510 A1    Feb. 10, 2022

(30) Foreign Application Priority Data
Nov. 21, 2019 (CN) .......................... 201911149061.3

(51) Int. Cl.
*H02J 3/32* (2006.01)
*H02J 7/00* (2006.01)

(52) U.S. Cl.
CPC .............. *H02J 3/32* (2013.01); *H02J 7/0014* (2013.01); *H02J 7/0048* (2020.01)

(58) Field of Classification Search
CPC ....................................................... H02J 3/32
See application file for complete search history.

(56) References Cited

U.S. PATENT DOCUMENTS

| 6,005,788 | A | * | 12/1999 | Lipo | ..................... | B60L 15/007 |
| | | | | | | 363/71 |
| 10,079,558 | B2 | * | 9/2018 | Flannery | ............... | H02J 3/1857 |

(Continued)

FOREIGN PATENT DOCUMENTS

| CN | 102025165 A | * | 4/2011 | ............... H02J 3/32 |
| CN | 207266482 U | | 4/2018 | |

(Continued)

*Primary Examiner* — Adi Amrany
(74) *Attorney, Agent, or Firm* — Bayramoglu Law Offices LLC

(57) ABSTRACT

A high-voltage hierarchy hundred-megawatt level (100 MW) battery energy storage system and optimizing and control methods are provided. The system includes a multi-phase structure, of which each phase is divided into multi-story spaces from top to bottom. A battery module is provided in each story of the multi-story spaces. The battery module is connected to a DC terminal of an H-bridge converter, and each phase is cascaded by the H-bridge converter. A capacity of the single-phase energy storage apparatus of the present invention is large, and multiple phases can be connected in parallel to form a 100 MW battery energy storage power station. The power station has the advantages of simple structure, easy coordinated control, low control loop model and coupling, and optimal system stability. The control system of the present invention has fewer hierarchies, a small information transmission delay, and a rapid response speed.

19 Claims, 4 Drawing Sheets

(56) References Cited

U.S. PATENT DOCUMENTS

| | | | | |
|---|---|---|---|---|
| 2006/0001516 A1* | 1/2006 | Mazur | ............... | H01F 30/12 |
| | | | | 336/5 |
| 2014/0368215 A1* | 12/2014 | Hoffman | ............ | G01R 15/14 |
| | | | | 324/552 |
| 2015/0009731 A1* | 1/2015 | Kim | ............ | H02M 7/49 |
| | | | | 363/59 |
| 2017/0063215 A1* | 3/2017 | Nikitin | ............... | H02M 7/23 |
| 2018/0274122 A1* | 9/2018 | Guskov | ............ | H02M 3/33507 |
| 2019/0017262 A1* | 1/2019 | Rodriguez | ............ | E04B 1/941 |
| 2021/0021206 A1* | 1/2021 | Wang | ............... | H02M 1/14 |
| 2022/0052620 A1* | 2/2022 | Du | ............... | H02M 1/0043 |

FOREIGN PATENT DOCUMENTS

| | | | |
|---|---|---|---|
| CN | 109728369 A | | 5/2019 |
| CN | 110350564 A | | 10/2019 |
| CN | 111092449 A | | 5/2020 |
| CN | 109728369 B | * | 9/2020 |

\* cited by examiner

HIGH-VOLTAGE HIERARCHY HUNDRED-MEGAWATT LEVEL BATTERY ENERGY STORAGE SYSTEM

CROSS REFERENCE TO THE RELATED APPLICATIONS

This application is the national phase entry of International Application No. PCT/CN2020/109169, filed on Aug. 14, 2020, which is based upon and claims priority to Chinese Patent Application No. 201911149061.3, filed on Nov. 21, 2019, the entire contents of which are incorporated herein by reference.

TECHNICAL FIELD

The present invention relates to the technical field of electrical automation equipment, and in particular, to a high-voltage hierarchy hundred-megawatt level battery energy storage system.

BACKGROUND

Currently, the energy crisis and environmental pollution have attracted much attention. Countries around the world are aggressively developing large-scale renewable energy power generation in order to build a highly-efficient, clean and smart energy source grid for the future. A high proportion of large-scale wind and solar power sources have been connected to power grids to promote grid-side battery energy storage power stations to enter a hundred-MW level and move to a GW level, which advances higher requirements for safety, operating efficiency and dynamic characteristics.

An energy storage power conversion system (PCS) is an interface of a battery stack and a power grid. The conventional topology structure of PCS is a low-voltage three-phase two-level conversion circuit with a single capacity of about 500 kW. A hundred-MW level energy storage power station is formed by merging numerous PCSs into a high-voltage power grid after being boosted by multi-stage transformers. In such an energy storage power station, in one aspect, as for a 500 kW battery stack, since it is formed by nearly ten thousand battery cells connected in series and parallel, inconsistency of the battery cells causes parallel current circulation to trigger the battery stack to heat and burn, so that safety of the battery stack is low. In another aspect, the circulating current loss, high switching frequency of conventional PCS and extensive use of transformers in the battery stack reduce the efficiency of a grid-connected system. Additionally, the capacity of a single PCS is extremely small, hundreds of energy storage apparatuses are required to be connected in parallel when forming a large-capacity energy storage power station of a hundred-megawatt level. The structure of the power station is complicated, and coordinate control between the apparatus is difficult, and the control instruction must be transmitted through a multi-level information system, which seriously affects the response speed of the system. Therefore, a novel high-voltage and high-power conversion system is highly desirable in order to meet the challenge of a hundred-megawatt level battery energy storage system.

SUMMARY

With respect to the defects in the prior art, the objective of the present invention is to provide a high-voltage hierarchy hundred-megawatt level (100 MW) battery energy storage system.

A high-voltage hierarchy 100 MW battery energy storage system provided according to the present invention includes a multi-phase structure, of which each phase is divided into multi-storey spaces from top to bottom; a battery module is provided in each storey of the multi-storey spaces; the battery module is connected to a direct current (DC) terminal of an H-bridge converter; and each phase is cascaded by the H-bridge converter.

Preferably, the multi-story spaces are mutually isolated spaces, and the battery modules in each storey are isolated from each other.

Preferably, a step-up transformer and a power transmission tower are further included, the cascaded H-bridge converters are connected to the step-up transformer through a high-voltage cable, and the step-up transformer is connected to the power transmission tower.

Preferably, a buffer unit is further included, a DC side of the H-bridge converter is connected to the battery module through the buffer unit, and the buffer unit isolates the battery module from the H-bridge converter.

Preferably, a secondary side of the step-up transformer is in a star-type connection and a neutral point is grounded. A neutral point of the H-bridge converter is also grounded.

Preferably, the step-up transformer includes three sets of three-phase voltages with phase differences.

A high-voltage hierarchy 100 MW battery energy storage optimizing method based on the above system is provided according to the present invention and includes following steps:

obtaining an optimal module number design by calculating efficiency and reliability of the system under different module number designs and drawing a relationship curve between the efficiency, the reliability and the module number according to design indicator requirements of the system in conjunction with the efficiency and reliability curves.

A high-voltage hierarchy 100 MW battery energy storage control method of the above system provided according to the present invention includes following steps:

an upper-level control step: coordinately controlling each chain-type battery energy storage system, and calculating an active power undertaken by each apparatus through a state-of-charge (SOC) value thereof;

a lower-level control step: controlling a single chain-type battery energy storage system, and a control strategy of each parallel chain-type battery energy storage system is the same.

Preferably, the lower-level control includes SOC balancing control, module failure control, control under grid asymmetry or failure, and power decoupling control.

In comparison with the prior art, the present invention has the following advantages:

1. The capacity of the single-phase energy storage apparatus of the present invention is large, which can reach about 12 MW, and 9 phases can be connected in parallel to form a 100 MW battery energy storage power station. The power station has the advantages of simple structure, easy coordinated control, low control loop model and coupling, and optimal system stability.

2. The control system of the present invention has less hierarchies, a small information transmission delay, and a rapid response speed.

3. The energy storage system of the present invention can be directly connected to a 10-35 kV power grid without a transformer, and the overall system efficiency is high. The battery stack can be segmentally managed and controlled through the chain converters, resulting in good safety, small battery stack, and small circulating current in the stack.

4. The designed space of the present invention has a reasonable layout, covers a small area, has a low cost, is convenient for maintenance, while ensuring design safety requirements for safe energy storage.

BRIEF DESCRIPTION OF THE DRAWINGS

Other features, objectives and advantages of the present invention will become more apparent by reading detailed description on non-limited embodiments that is made with reference to the following figures.

DETAILED DESCRIPTION OF THE EMBODIMENTS

The present invention will now be explained in detail in conjunction with exemplary embodiments. The following embodiments will help those skilled in the art to further understand the present invention, but will not limit the present invention in any form. It should be pointed out that for those skilled in the art, various changes and improvements can be further made without departing from the concept of the present invention. All these changes and improvements belong to the protection scope of the present invention.

As shown in FIGS. 1 to 4, an implementation and construction plan of the high-voltage hierarchy 100 MW battery energy storage system is provided according to the present invention. Its core concept is constructing the high-voltage hierarchy 100 MW battery energy storage system into a cement tower-type multi-story building, and placing battery modules in cement structure rooms to isolate the battery modules from each other. Fire-fighting facilities are also included in the rooms, and the battery modules are isolated from converter modules by buffer units and cement walls. It is composed of cascaded H-bridge sub-module string of 9 phases. Each phase differs by 40 degrees, and star-type wiring is used. The voltage of a battery module chained to each H-bridge sub-module is less than 1,500 V, the battery module is merely formed by battery cells connected in series, each phase has a maximum capacity of about 12 MW, and 9 phases can constitute a hundred-MW level application. Battery modules and converter modules of the same phase are stacked in a vertical direction. From the top of the tower to the bottom of the tower is one phase of the chain-type battery energy storage system. When 9 phases are connected in parallel, the energy storage tower has 9 total columns in the vertical direction. A system output is connected to a 35 kV/220 kV step-up transformer through a high-voltage cable, a 220 kV side of the transformer is connected to a power transmission tower through an overhead line, and the transformer may be a double-winding transformer or a four-winding phase-shifting transformer. A buffer unit is added between the battery stack and the converter, which may be a reactor or a DC/DC converter for optimizing an outlet voltage of the battery pack and suppressing double-frequency pulsation of a charging and discharging current of the battery pack.

Figure 1:
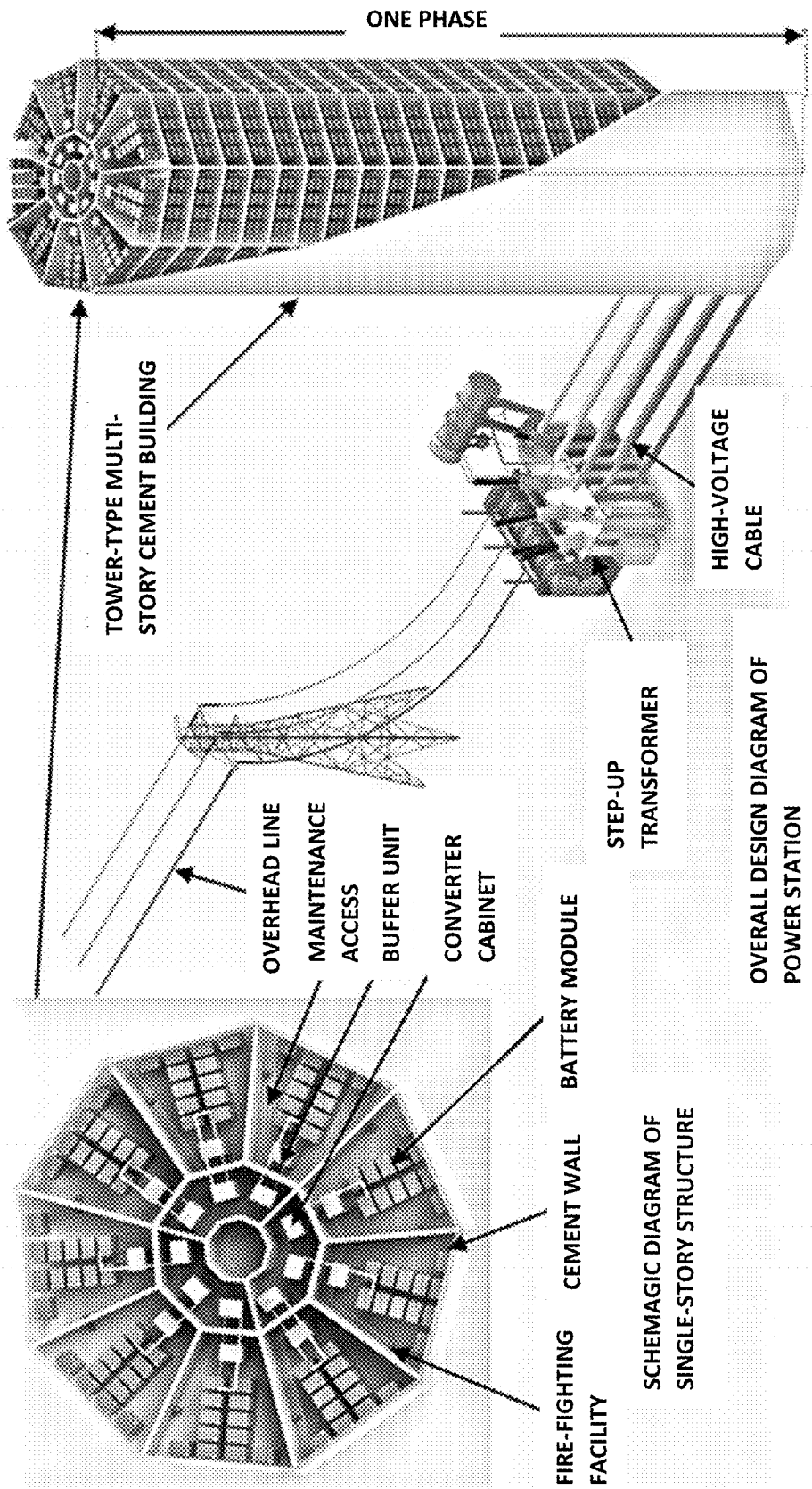
FIG. 1 is a design diagram while specifically implementing and constructing a high-voltage hierarchy 100 MW battery energy storage system of the present invention.
Figure 2:
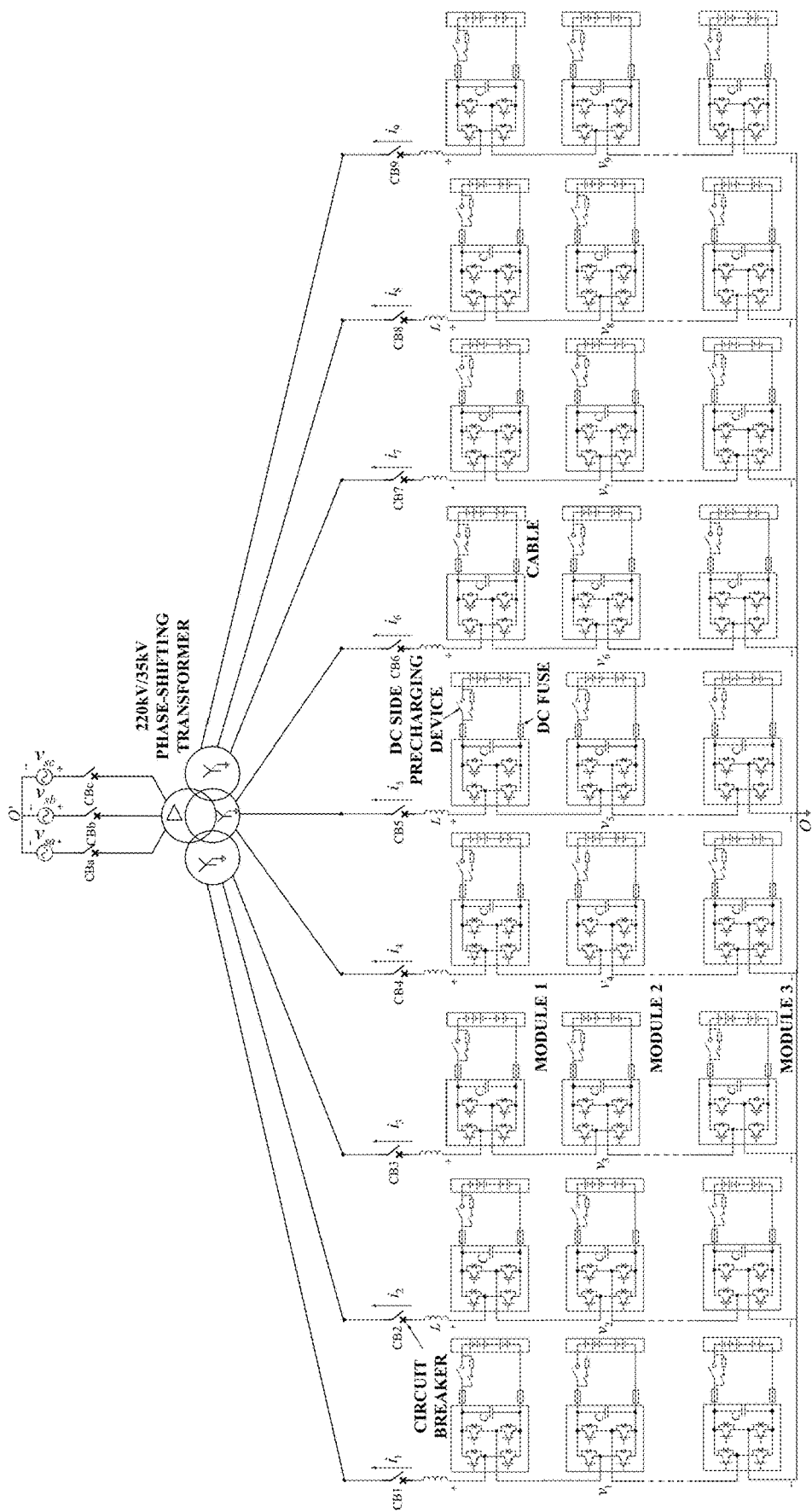
FIG. 2 is a structural schematic diagram of the high-voltage hierarchy 100 MW battery energy storage system of the present invention.

FIG. 2 is a structural diagram of a high-voltage hierarchy 100 MW energy storage system based on the chain-type battery energy storage systems connected in parallel in an embodiment of the present invention. The maximum capacity of a single-phase battery energy storage system can reach about 12 MW, thus, 9 phases are connected in parallel to form a 100 MW application. Each phase of the chain-type battery energy storage system is formed by cascading N power modules, and each power module is mainly formed by an H-bridge power device, and a driving circuit, a bus capacitor, a DC fuse and a battery side pre-charging device thereof. The DC side of the H-bridge power module is connected to the battery module through the high-voltage cable. A chain-type converter is directly connected to a 35 kV power grid through a filter inductor L and a circuit breaker at an AC side, and connected to a 220 kV power grid after being boosted by a four-winding phase-shifting transformer. In the figure, $v_{sa}$, $v_{sb}$, $v_{sc}$ is a power grid voltage, $v_k$ is an output voltage of a $k^{th}$-phase chain-type battery energy storage system, $i_k$ is an output current of the $k^{th}$-phase chain-type battery energy storage system (in this embodiment, k=1, 2, 3 . . . 9), and a neutral point of the converter is grounded. In the figure, the transformer is a four-winding phase-shifting transformer, which can provide three sets of three-phase voltages with phase differences to eliminate low-order harmonics, reduce a switching frequency, and improve system efficiency. Primary windings are connected in Δ type, three windings at the secondary side are connected in Y type, and a neutral point is grounded. Since the neutral points of the transformer and 9 phases are all grounded, each phase can be independently controlled and protected. During the specific implementation, the number of chain-type battery energy storage systems connected in parallel and a capacity of the single battery energy storage system can be changed according to the specific demands.

Figure 3:
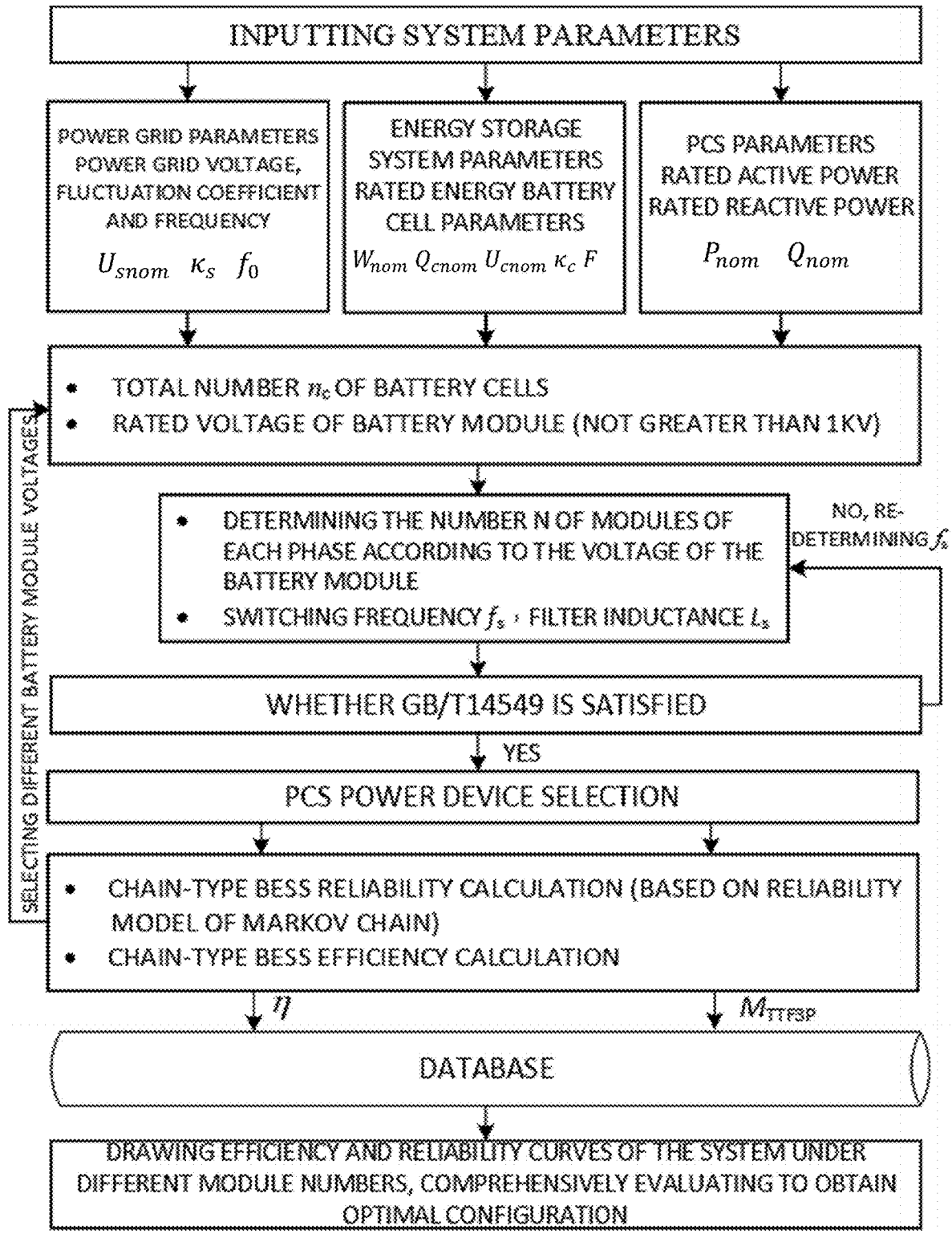
FIG. 3 is an optimized design flow chart of the high-voltage hierarchy 100 MW battery energy storage system of the present invention.

FIG. 3 is an optimized design flow chart of the high-voltage hierarchy 100 MW battery energy storage system in an embodiment of the present invention. An optimal module number design can be obtained by calculating efficiency and reliability of the system under different module number designs, drawing a relationship curve between the efficiency, the reliability and the module number, and comprehensively evaluating according to design indicator requirements of the system in conjunction with the efficiency and reliability curves.

Figure 4:
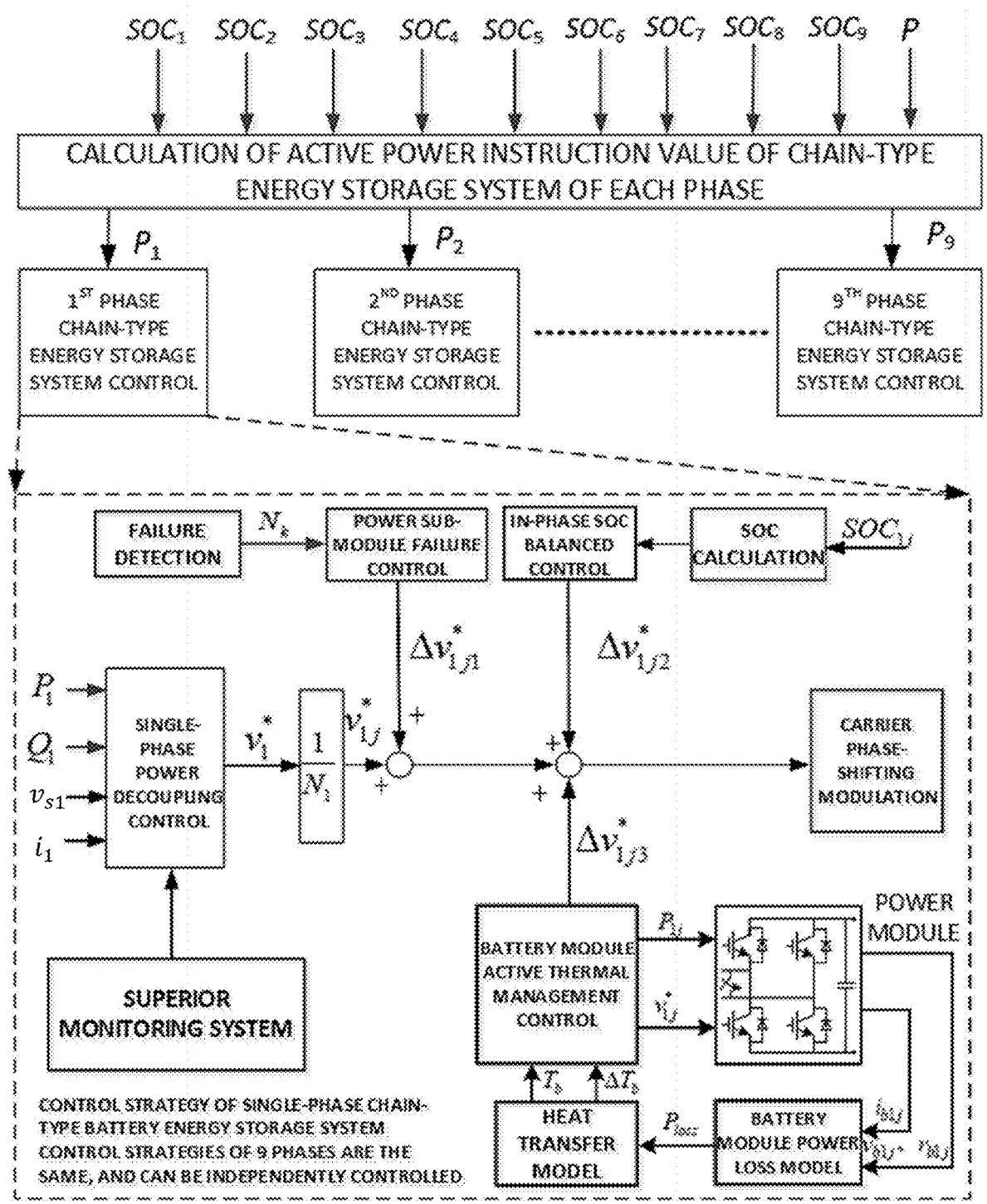
FIG. 4 is an overall control block diagram of the high-voltage hierarchy 100 MW battery energy storage system of the present invention.

FIG. 4 is an overall control block diagram of the high-voltage hierarchy 100 MW battery energy storage system in an embodiment of the present invention. An entire control strategy is divided into two hierarchies: 1) upper-level control is the coordinate control of the chain-type battery energy storage systems of respective phases, an active power undertaken by the apparatus of each phase is calculated through its SOC, active or reactive decoupling control is performed on the single-phase chain-type battery energy storage system, and the upper-level control is interconnected with a superior monitoring system; and 2) lower-level control is in-phase SOC balancing control of a single-phase chain-type battery energy storage system, module failure control, and battery module active thermal management control.

The upper-level control of the control strategy of the high-voltage hierarchy 100 MW battery energy storage system of the present invention is the coordinated control of each chain-type battery energy storage systems, and the active power undertaken by each apparatus is calculated through an SOC of each apparatus. The active power undertaken by each apparatus can be calculated through a formula (1), and in the formula, P is a charging and discharging power of the entire system, and $SOC_k$ is an SOC value of the parallel apparatuses of the $k^{th}$ phase, and can be calculated through a formula (2), wherein $N_k$ is the number of the modules that work normally of the $k^{th}$ phase, and $SOC_{kj}$ is an SOC value of the $j^{th}$ power module of the $k^{th}$ phase (j=1, 2, ... $N_k$).

$$P_k = \begin{cases} \dfrac{SOC_k}{SOC_1 + SOC_2 + \ldots + SOC_9} & \text{Discharging} \\ \dfrac{1 - SOC_k}{(1 - SOC_1) + (1 - SOC_2) + \ldots + (1 - SOC_9)} & \text{Charging} \end{cases} \quad (1)$$

$$SOC_k = \frac{\sum_{j=1}^{N_k} SOC_{kj}}{N_k} \quad (2)$$

The lower-level control of the control strategy of the high-voltage hierarchy 100 MW battery energy storage system of the present invention is the in-phase SOC balancing control of a single-phase chain-type battery energy storage system, module failure control, and battery module active thermal management control. The control strategy of each parallel chain-type battery energy storage system is the same, and here the first chain-type battery energy storage system is taken as an example to describe its control strategy. A modulation wave $v_1^*$ is generated by power decoupling control. The in-phase SOC balancing control of the chain-type battery energy storage system, the power balancing control during the module failure, and the active thermal management control of the battery module all can be implemented by overlapping AC signals (i.e., $\Delta v_{1j1}^*$, $\Delta v_{1j2}$, $\Delta v_{1j3}$) generated by the corresponding control on the initial modulation wave to change an output voltage of the corresponding module to further change its output power. The battery module active thermal management control can detect a battery temperature $T_b$ and a battery temperature change $\Delta T_b$ in real time, and allocate the power $P_{1j}$ undertaken thereby in real time accordingly. In the figure, $v_{b1j}$, $i_{b1j}$, $r_{b1j}$ are a voltage, a current and an internal resistance of the $j^{th}$ battery module of the first phase, respectively, and $P_{loss}$, is its loss power. During the specific implementation, the control strategies of the 9-phase chain-type battery energy storage systems are the same, and can be independently controlled.

The exemplary embodiments of the present invention are described above. It should be understood that the present invention is not limited to the above specific embodiments, those skilled in the art can make various changes or modifications within the scope of the claims, and this does not affect the substantive contents of the present invention. The embodiments and the features in the embodiments of the present application can be combined with each other in the case where there is no conflict.

What is claimed is:

1. A high-voltage hierarchy hundred-megawatt level (100 MW) battery energy storage system, comprising a multi-phase structure, wherein the multi-phase structure includes nine phases each differs by 40 degrees, and each phase has a maximum capacity of 12 MW, wherein each phase of the multi-phase structure is divided into multi-storey spaces from top to bottom; wherein battery modules are provided in each storey of the multi-storey spaces the battery modules are connected to direct current (DC) terminals of H-bridge converters; and the each phase is cascaded by the H-bridge converters to form cascaded H-bridge converters; and wherein each of the battery modules is formed by battery cells connected in series, and a voltage of each of the battery modules is less than 1,500V.

2. The high-voltage hierarchy 100 MW battery energy storage system of claim 1, wherein the multi-storey spaces are mutually isolated spaces, and the battery modules in the each storey are mutually isolated modules.

3. The high-voltage hierarchy 100 MW battery energy storage system of claim 1, further comprising a step-up transformer and a power transmission tower, wherein the cascaded H-bridge converters are connected to the step-up transformer through a high-voltage cable, and the step-up transformer is connected to the power transmission tower.

4. The high-voltage hierarchy 100 MW battery energy storage system of claim 3, wherein a secondary side of the step-up transformer is in a star-type connection and a neutral point of the step-up transformer is grounded, and a neutral point of the each of the H-bridge converters is grounded.

5. The high-voltage hierarchy 100 MW battery energy storage system of claim 3, wherein the step-up transformer comprises three sets of three-phase voltages with phase differences.

6. The high-voltage hierarchy 100 MW battery energy storage system of claim 1, further comprising a buffer unit, wherein the DC terminals of the H-bridge converters are connected to the battery modules through the buffer unit, and the buffer unit isolates the battery modules from the H-bridge converters.

7. A high-voltage hierarchy 100 MW battery energy storage optimizing method of the high-voltage hierarchy 100 MW battery energy storage system of claim 1, comprising the following steps:
obtaining an optimal module number design by calculating an efficiency and a reliability of the high-voltage hierarchy 100 MW battery energy storage system under a design of different module numbers and drawing a relationship curve between the efficiency, the reliability and the different module numbers according to design indicator requirements of the high-voltage hierarchy 100 MW battery energy storage system in conjunction with the relationship curve.

8. The high-voltage hierarchy 100 MW battery energy storage optimizing method of claim 7, wherein the multi-storey spaces are mutually isolated spaces, and the battery modules in the each storey are mutually isolated modules.

9. The high-voltage hierarchy 100 MW battery energy storage optimizing method of claim 7, wherein the high-voltage hierarchy 100 MW battery energy storage system further comprises a step-up transformer and a power transmission tower, wherein the cascaded H-bridge converters are connected to the step-up transformer through a high-voltage cable, and the step-up transformer is connected to the power transmission tower.

10. The high-voltage hierarchy 100 MW battery energy storage optimizing method of claim 9, wherein a secondary side of the step-up transformer is in a star-type connection and a neutral point of the step-up transformer is grounded, and a neutral point of the each of the H-bridge converters is grounded.

11. The high-voltage hierarchy 100 MW battery energy storage optimizing method of claim 9, wherein the step-up transformer comprises three sets of three-phase voltages with phase differences.

12. The high-voltage hierarchy 100 MW battery energy storage optimizing method of claim 7, wherein the high-voltage hierarchy 100 MW battery energy storage system further comprises a buffer unit, wherein the DC terminals of the H-bridge converters are connected to the battery modules through the buffer unit, and the buffer unit isolates the battery modules from the H-bridge converters.

13. A high-voltage hierarchy 100 MW battery energy storage control method of the high-voltage hierarchy 100 MW battery energy storage system of claim 1, comprising the following steps:
- an upper-level control step: coordinately controlling each chain-type battery energy storage system, and calculating an active power undertaken by each apparatus through a state-of-charge (SOC) value of the each apparatus;
- a lower-level control step: controlling a single chain-type battery energy storage system, wherein a control strategy of the each chain-type battery energy storage system is the same.

14. The high-voltage hierarchy 100 MW battery energy storage control method of claim 13, wherein the lower-level control step comprises an SOC balancing control, a module failure control, a control under a grid asymmetry or a failure, and a power decoupling control.

15. The high-voltage hierarchy 100 MW battery energy storage control method of claim 13, wherein the multi-storey spaces are mutually isolated spaces, and the battery modules in the each storey are mutually isolated modules.

16. The high-voltage hierarchy 100 MW battery energy storage control method of claim 13, wherein the high-voltage hierarchy 100 MW battery energy storage system further comprises a step-up transformer and a power transmission tower, wherein the cascaded H-bridge converters are connected to the step-up transformer through a high-voltage cable, and the step-up transformer is connected to the power transmission tower.

17. The high-voltage hierarchy 100 MW battery energy storage control method of claim 16, wherein a secondary side of the step-up transformer is in a star-type connection and a neutral point of the step-up transformer is grounded, and a neutral point of the each of the H-bridge converters is grounded.

18. The high-voltage hierarchy 100 MW battery energy storage control method of claim 16, wherein the step-up transformer comprises three sets of three-phase voltages with phase differences.

19. The high-voltage hierarchy 100 MW battery energy storage control method of claim 13, wherein the high-voltage hierarchy 100 MW battery energy storage system further comprises a buffer unit, wherein the DC terminals of the H-bridge converters are connected to the battery modules through the buffer unit, and the buffer unit isolates the battery modules from the H-bridge converters.

* * * * *